United States Patent [19]

Bresak et al.

[11] 4,208,471

[45] Jun. 17, 1980

[54] UV-CURABLE SILOXANE RAZOR BLADE LACQUERS

[75] Inventors: Ann F. Bresak; Eva Tolgyesi, both of Rockville, Md.

[73] Assignee: The Gillette Company, Boston, Mass.

[21] Appl. No.: 972,577

[22] Filed: Dec. 22, 1978

[51] Int. Cl.$^2$ .................... C08L 43/04; C08L 38/00; C08F 2/46; C08F 30/08
[52] U.S. Cl. ................... 428/447; 204/159.13; 260/348.41; 427/387; 427/54.1; 428/416; 428/429; 428/450; 428/463; 525/477; 525/479; 528/27; 528/32
[58] Field of Search ............... 260/827, 348.41; 528/27, 32; 204/159.13; 427/54; 428/447, 450, 416, 463

[56] References Cited

U.S. PATENT DOCUMENTS

| 3,650,811 | 3/1972 | Nordstrom et al. | 260/827 X |
| 3,723,167 | 3/1973 | Nordstrom | 117/93.31 |
| 4,107,390 | 8/1978 | Gordon et al. | 428/447 |
| 4,116,786 | 9/1978 | Hodakowski | 204/159.13 |

Primary Examiner—Richard B. Turer
Attorney, Agent, or Firm—Richard A. Wise; Leonard J. Janowski

[57] ABSTRACT

Radiation curable coating compositions containing hydroxy-functional, cyclic polysiloxane resins and compounds of the formula

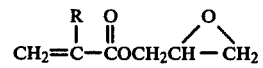

wherein R is —H or —CH$_3$. The compositions are especially useful as razor blade body coatings.

7 Claims, No Drawings

UV-CURABLE SILOXANE RAZOR BLADE LACQUERS

BACKGROUND OF THE INVENTION

1. Field of the Invention

The present invention relates to a radiation curable lacquer for coating substrates. The lacquer is particularly useful in applications where the cured coating must remain clear, colorless, adherent, and solvent-resistant even after being heated as high as 350° C.

2. Description of the Prior Art

Although lacquer resins curable under ultraviolet light are well known in the prior art, none meet the requirements for razor blade lacquer coatings: clear, colorless, adherent, solvent-resistant coatings having good thermal stability under the sintering conditions experienced during razor blade manufacture. As described in U.S. Pat. No. 3,071,856 and 3,518,110, coating the cutting edge of a razor blade with polytetrafluoroethylene dramatically decreases the amount of effort required to cut hair during shaving. To sinter that blade edge coating, a razor blade must be heated to temperatures between 200° and 430° C. Since blade edge coatings are applied after blade body coatings, body coatings must be ble to withstand these elevated temperatures without undesirable side effects, such as lack of adhesion or discoloration. Prior art polymer systems may contain a plurality of ester or urethane groups which can be thermally unstable at sintering temperatures.

A typical radiation curable lacquer is disclosed in U.S. Pat. No. 3,749,592, which describes a lacquer film particularly suggested for use in the finishing of wooden furniture. The preferred resin system comprises the addition reaction product of a hydroxy-functional lacquer grade resin and an ethylenically unsaturated monoisocyanate. Typical hydroxy-functional lacquer grade resins are nitrocellulose and hydroxyethyl cellulose. Cellulose acetate butyrate is also stated to be useful.

Another similar composition is described in U.S. Pat. No. 3,808,114. That patent describes a radiation curable composition comprising a major amount of unsaturated hydroxy-containing ester type polyester, and an effective amount of a light sensitizer, and optionally a small amount of a copolymerizable monomer. The polyester is produced by reacting an organic polybasic acid with a polyglycidyl ester having one or more epoxy groups in the molecule, and an unsaturated monobasic acid, under heating, by using an esterification catalyst in the presence of a polymerization inhibitor.

Finally, U.S. Pat. No. 3,864,133, describes a photopolymerizable composition which comprises a combination of a compound containing an ethylenically-unsaturated double bond and a urethane linkage, with at least one radical or linkage selected from the group consisting of secondary amino radical, tertiary amino radical, or urea linkage, and a photopolymerization initiator.

While each of the above patents describes a composition which is curable by ultraviolet radiation, they are not useful in the present invention because of failing to meet one or more of the above requirements for razor blade body coatings.

Accordingly, a need exists for radiation curable razor blade coatings which can be cured rapidly at low temperatures, and which after curing will possess the desired properties of hardness, adhesion, solvent resistance and thermal stability necessary for use as a razor blade body coating.

SUMMARY OF THE INVENTION

The present invention comprises a curable film-forming composition produced by reacting a hydroxy-functional, cyclic, polysiloxane resin having at least two hydroxyl groups per molecule with a compound of the formula

wherein R is —H or —CH$_3$, the reaction proportions ranging from about 2:1 to 1:10. An optional but preferred additional reactant is a compound of the formula

wherein R' is —H or —CH$_3$, the reaction proportions of the cyclic, polysiloxane resin to additional reactant ranging from about 3:1 to 1:5. The combination produces a prepolymer which can be radiation cured on a razor blade to give a coating which has the necessary hardness, adhesion, and solvent resistance required of razor blade body coatings and is stable at temperatures required for sintering blade edge coatings.

DETAILED DESCRIPTION OF THE INVENTION

The prepolymer which is eventually cured by radiation is composed of two main ingredients: a hydroxy-functional, cyclic, polysiloxane resin having at least two hydroxyl groups per molecule and a compound of the formula

wherein R is —H or —CH$_3$. A preferred but optional ingredient is a compound of the formula

wherein R' is —H or —CH$_3$. These compounds are reacted to form a prepolymer which can then be combined with various diluents, photosensitizers, and oxygen inhibitors to produce a composition which can be cured on a razor blade by radiation.

To produce a coating which is stable at higher temperatures, it is desirable to incorporate silicone copolymers. These are known to possess good thermal stability and film forming characteristics. In addition, the presence of vinyl or acrylic groups will serve as curing sites. Accordingly, compositions were examined which contained both these ingredients, on the assumption that a high inorganic content contributes to thermal stability, while crosslink formation is made possible by the double bonds in the prepolymers.

The siloxane employed in the preparation of the prepolymer has a reactive hydroxyl or an alkoxy group, advantageously a $C_1$–$C_4$ and preferably a $C_1$–$C_2$ alkoxy group bonded to at least two of its silicon atoms. The term "siloxane" as employed herein refers to a compound such as

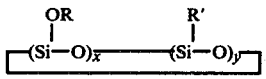

where R' is a $C_1$–$C_6$ alkyl chain or a phenyl group and R is hydrogen or a $C_1$–$C_4$ alkyl chain. The siloxanes are cyclic and contain two to five hydroxy and/or alkoxy functional groups.

The other ingredient of the prepolymer is a compound of the formula

wherein R is —H or —$CH_3$. This compound is typically used in molar ratios from about 2:1 to about 1:10, preferably about 1:5.

A preferred but optional additional reactant is a compound of the formula

wherein R' is —H or —$CH_3$. It is typically incorporated in the prepolymer in a molar ratio of about 3:1 to about 1:5, preferably 1:3.

To synthesize a prepolymer which is eventually combined with other ingredients to produce the final coating, either the first two ingredients listed above or all three are combined in the following manner. The monomers and ether solvent are charged into an appropriate size round bottom flask equipped with mechanical stirrer, dropping funnel, and condenser. Orthophosphoric acid is then added dropwise. Since the reaction is sufficiently exothermic to induce reflux, the acid addition rate is adjusted to maintain slow reflux. After the addition is complete, the solution is stirred for five to twenty-four hours. Finally, the solution is washed with an aqueous solution of sodium chloride to pH5-6, the ether layer dried over sodium sulfate, and the ether evaporated. The resulting prepolymer has a molecular weight range between about 2,000 and about 4,000, preferably between about 3,000 and about 3,500, as determined by gel permeation chromatography.

The resulting prepolymer may be combined with a monomer diluent and/or a photosensitizer to produce a radiation curable composition.

Typical examples of diluents which may be incorporated in the range from between 0 and 35%, preferably between 20 and 25% include:

1,2-propanediol dimethacrylate
pentaerythritol triacrylate
trimethylolpropane triacrylate
1,6-hexanediol diacrylate
dimethylaminoethyl acrylate
diallyl maleate
ethylene dimethacrylate
hydroxypropyl methacrylate
allyl acrylate
allyl methacrylate
diallyl fumarate
pentaerythritol tetramethacrylate
furfuryl acrylate
benzyl acrylate
ethylene glycol acrylate phthalate
2-ethylhexyl acrylate
2-ethoxyethyl acrylate
2-methoxyethyl acrylate
neopentyl glycol diacrylate
triethylene glycol diacrylate
tetraethylene glycol diacrylate
melamine acrylate
2-phenoxyethyl acrylate
N-(iso-butoxymethyl)acrylate
2-hydroxyethyl methacrylate
trimethylolpropane triacrylate
dimethylaminopropylmethacrylamide
vinyl acetate
N-vinyl pyrrolidone Examples of photosensitizers which may be incorporated in a range between 0 and 15%, preferably between 1 and 2% include:

α-aminoacetophenone
4-amino-9-fluorenone
4,4'-bis-(dimethylamino)benzophenone
α-bromoisobutyrophenone
2-chloroanthraquinone
1,2-dihydroxyanthraquinone
3',5'-dimethoxyacetophenone
4-(dimethylamino)benzophenone
2-ethylanthraquinone
9-fluorenone
ω-methoxyacetophenone
diacetyl
isopropyl benzoin ether
isobutyl benzoin ether
2,2-diethoxyacetophenone
2',4'-dimethoxyacetophenone
2-t-butylanthraquinone
4-(dimethylamino)benzophenone
2,2-dimethoxy-2-phenylacetophenone In its preferred use, the composition consisting of prepolymer, and which may contain a monomer diluent and sensitizer, is coated onto a clean carbon steel razor blade and cured by exposure to radiation as described below.

The composition can be cured by exposure to any source of ultraviolet light having a wave length of from about 250 to about 390 nm. Any ultraviolet light source which emits the above defined wave lengths can be used to cure those compositions set forth above. There are ultraviolet lamps available commercially which produce ultraviolet light in the above range. In addition, there are a number of ways in which those utilizing the present invention can control the cure time to meet their own specific manufacturing requirements. For example, the cure time can be regulated by the number of ultraviolet lamps used; the dwell time, that is, the length of time which the composition is exposed to the ultraviolet light; and the distance between the composition being cured and the ultraviolet light source. In curing, care should be taken to avoid temperatures which might cause volatilization of reactive components or promote undesirable side reactions. In general, we have found that the curing process should be conducted at temperatures not exceeding 70° C.

To allow the prepared formulation to be stored on the shelf for longer periods of time, it is desirable to also add an oxygen inhibitor, which prevents slow premature polymerization caused by oxygen. These are typically employed in a range between 0 and 1%, preferably between 0.01 and 0.1%. Examples of typical oxygen inhibitors usable in the present invention include: methylhydroquinone, catechol, 4-t-butyl catechol, phenothiazine, and octadecyl 3-(3',5'-di-t-butyl-4'-hydroxyphenyl)propionate.

Finally, while the ingredients described above will produce a clear coating, it may be desirable in some situations to prepare a colored composition. Accordingly, it is possible to add pigments and dyes, if desired. They are typically incorporated by milling into the prepared formulation. Examples of such pigments and dyes include: white hiding pigments such as titanium dioxide, cyanine pigments such as copper phthalocyanine derivatives, other inorganic pigments such as carbon blacks, and solvent dyes such as azo chrome complexes. All of the above may be used alone or in mixtures.

While the coatings have been described as useful on steel blades, they may also be used as protective or decorative coatings on other substrates such as aluminum alloy, aluminum sheeting, tin metal, tin foil, brass, copper, silver, glass, and plastic. On each of these substrates, coatings can be produces which are hard, adherent, and produce no discoloration of the underlying substrate.

The following examples are given by way of illustration only and are not to be considered as limiting the scope of the invention.

EXAMPLE I

A. Preparation of the Polymer 120 grams (0.300 eq.) of a hydroxy-functional cyclic polysiloxane (*) is dissolved in 600 ml of anhydrous ethyl ether. To this is added 249.9g. (1.76 mole) glycidyl methacrylate. Then 48 ml (0.7 mole) of 85% orthophosphoric acid is added dropwis to the stirred solution and the mixture refluxed for 24 hours.

The ether solution is extracted with concentrated aqueous sodium chloride solution to a pH of between five and six as measured by pH paper, dried over sodium sulfate, and the ether distilled off.

*A commercially available (Dow Corning Z-6018) hydroxy-functional, cyclic, polysiloxane having the following properties:

| Hydroxy content, Dean Stark | |
|---|---|
| % Condensable | 5.5 |
| % Free | 0.5 |
| Average Molecular Weight | 1600 |
| Combining Weight | 400 |
| Refractive Index | 1.531 to 1.539 |
| Softening Point, Durran's Mercury Method, Degrees F. | 200 |
| At 60% solids in xylene Specific gravity at 77° F. | 1.075 |
| Viscosity at 77° F. centipoises | 33 |
| Gardner-Holdt | A-1 |

B. Preparing and Curing the Lacquer

One gram of isobutyl benzoin ether was dissoved in 25 grams of allyl acrylate. To this was added 75 grams of the prepolymer prepared in Part A. A trichloroethylene-degreased carbon steel blade was dipped into this formulation and immediately cured for one minute with a Hanovia 200 watt xenonmercury arc lamp focused at 20 cm with a 2.25 inch condensing lens. A continuous non-tacky film, which did not scratch with an 8H pencil was formed on the blade. To further test the coating, the blade was immersed in 40° C. trichlorothylene for 15 minutes and inspected for peeling and 8H pencil hardness. Finally, the blade was immersed in 40° C. soapy water for 15 minutes and again inspected for swelling, peeling, and 8H pencil hardness. The coating passed all of these tests and remained colorless and adherent even when heated to temperatures above 325° C.

EXAMPLE II

Example I is repeated using the folloing ingredients:

| A. | Preparation of the Prepolymer Ingredient | |
|---|---|---|
| | Hydroxy-functional cyclic polysiloxane resin of Example I | 150g (0.375 eq.) |
| | Anhydrous ethyl ether | 750 ml |
| | Glycidyl methacrylate | 312g (2.20 moles) |
| | 85% Orthophosphoric acid | 54g |
| B. | Preparing and Curing the Lacquer | |
| | Isobutyl benzoin ether | 1g |
| | Allyl acrylate | 25g |
| | Prepolymer from Part A | 75g |

The resulting composition, when cured on a razor blade, produced a hard, adherent, solvent-resistant coating which passed the tests described in Example I.

EXAMPLE III

A. Preparation of the Prepolymer 150g (0.375 eq.) of the hydroxyfunctional, cyclic, polysiloxane resin of Example I was dissolved in 565 ml of anhydrous ethyl ether. To this was added 279 g (1.125 moles) of gammamethacryloxypropyltrimethoxysilane and 266.25g (1.875 moles) of glycidyl methacrylate. Forty-five ml (0.67 moles) of 85% orthophosphoric acid was added dropwise to the stirred solution. When addition was complete the mixture was refluxed for two hours, and then allowed to cool. The ether solution was extracted with an aqueous solution of NaCl to pH 5–6 as measured by pH paper, dried over sodium sulfate and the ether distilled off.

B. Preparing and Curing the Lacquer

One gram of 2-t-butylanthraquinone and one gram of 2,2-dimethoxy-2-phenylacetophenone were dissolved in a solution containing 11.5 g of ethylene dimethacrylate and 11.5 g of 1,6-hexanediol diacrylate. To this was added 75 g of the prepolymer of Part A. A trichloroethylene-degreased carbon steel razor blade was coated with the resulting composition and immediately cured for one minute with a Hanovia 200 watt xenon-mercury arc lamp focused at 20 cm with a 2.25 inch condensing lens. The result was hard, adherent, solvent-resistant, and passed the tests described in Example I.

EXAMPLES IV–XV

The prepolymer in each Example was prepared according to the procedure of Part A of Example III using the ingredients and reaction conditions listed below. The sensitizer was then dissolved in the diluent and then prepolymer added to make 100% by weight. The resulting formulations were cured for the time stated according to the procedure of Part B of Example III to produce hard, adherent, solvent-resistant coatings which passed the tests described in Example I.

| Example | MPTS (g) | GM (g) | Z-6018 (g) | H3PO4 (ml) | Ethyl Ether (ml) | Reaction Time (hr) | Molar Ratio MPTS:GM:Z-6018 | Diluent (wt %) | Sensitizer (wt %) | Cure Time (min) |
|---------|----------|--------|------------|------------|------------------|--------------------|-----------------------------|----------------|-------------------|-----------------|
| IV | 342.3 | 180 | 180 | 72 | 900 | 24 | 3:3:1 | 25% AA | 1% IBBE | 2 |
| V | 37.2 | 20.4 | 30 | 12 | 150 | 5 | 2:2:1 | 25% AA | 1% IBBE | 2 |
| VI | 124 | 40.8 | 40 | 12 | 150 | 6 | 5:3:1 | 25% AA | 2% IBBE | 2 |
| VII | 74.4 | 68 | 40 | 12 | 150 | 6 | 3:5:1 | 25% AA | 2% IBBE | 2 |
| VIII | 49.6 | 27.2 | 40 | 12 | 150 | 24 | 2:2:1 | 25% AA | 2% IBBE | 2 |
| IX | 223.2 | 204 | 120 | 36 | 450 | 6 | 3:5:1 | 25% AA | 2% IBBE | 1 |
| X | 6.2 | 6.8 | 10 | 6 | 38 | 6 | 1:1:1 | 25% AA | 1% IBBE | 2 |
| XI | 223.2 | 204 | 120 | 36 | 450 | 6 | 3:5:1 | 25% EDM | 1% IBBE | 2 |
| XII | 223.2 | 204 | 120 | 36 | 450 | 6 | 3:5:1 | 25% HEM | 2% IBBE | 1 |
| XIII | 279 | 266.25 | 150 | 45 | 565 | 6 | 3:5:1 | 23% HDDA | 2% BAQ | 0.5 |
| XIV | 279 | 266.25 | 150 | 45 | 565 | 6 | 3:5:1 | 23% VA | 2% BAQ | 2.5 |
| XV | 279 | 266.25 | 150 | 45 | 565 | 6 | 3:5:1 | 11.5% HDDA 11.5% EDM | 1% BAQ 1% DMPA | 0.3 |

AA allyl acrylate
BAQ 2-t-butylanthraquinone
DMPA 2,2-dimethoxy-2-phenylacetophenone
EDM ethylene dimethacrylate
GM glycidyl methacrylate
HDDA 1,6-hexanediol diacrylate
HEM 2-hydroxyethylmethacrylate
IBBE isobutylbenzoin ether
MPTS methacryloxypropyltrimethoxysilane
VA vinyl acetate
Z-6018 = hydroxyfunctional, cyclic, polysiloxane resin of Example I

EXAMPLES XVI–XXIV

The prepolymer prepared in Part A of Example III was combined with the photosensitizers and diluents listed below as Formulations a, b, and c, according to the procedure of Part B of Example III. The formulations were applied to the substrate as a thin film and then cured according to the procedure of Part B of Example III. The cured films were hard, adherent, and solvent-resistant, and passed the tests described in Example I.

| EXAMPLE | SUBSTRATE | FORMULATION | CURE TIME (MIN) |
|---------|-----------|-------------|-----------------|
| XVI | Al alloy | a | 10 |
| XVII | Al sheeting* | b | 5 |
| XVIII | Tin sheet | c | 2 |
| XIX | Tin foil* | b | 2 |
| XX | Brass | b | 2 |
| XXI | Copper | b | 2 |
| XXII | Silver | a | 5 |
| XXIII | Glass | b | 5 |
| XXIV | Acrylic plastic sheet | b | 5 | a  75% prepolymer
   23% vinyl acetate
   2% 2',4'-dimethoxyacetophenone
b  75% prepolymer
   23% ethylene dimethacrylate
   2% 2-t-butylanthraquinone
c  75% prepolymer
   23% 1,6-hexanediol diacrylate
   2% 2-t-butylanthraquinone

*Since an 8H pencil indents the substrate, a fingernail was used to estimate film hardness.

EXAMPLE XXV–XXVIII

The prepolymer prepared in Part A of Example III was combined with the photosenitizers and diluents according to the procedure of Part B of Example III. The resulting formulation was used to coat trichloroethylene-degreased carbon steel and stainless steel razor blades and then cured according to the procedure of Part B of Example III to produce a hard, adherent, and solvent-resistant coating which passed the tests described in Example I.

| EXAMPLE | PREPOLYMER (% BY WT.) | DILUENT (% BY WT.) | SENSITIZER (% BY WT.) |
|---------|------------------------|---------------------|------------------------|
| XXV | 68% | 30% ethylene dimethacrylate | 2% 4-(dimethylamino)-benzophenone |
| XXVI | 63% | 35% 1,6-hexanediol diacrylate | 2% 4-(dimethylamino)-benzophenone |
| XXVII | 73% | 25% ethylene dimethacrylate | 2% 2-t-butyl anthraquinone |
| XXVIII | 71% | 27% 1,6-hexanediol diacrylate | 2% 2-t-butyl anthraquinone |

What is claimed is:

1. A method of producing a hard, adherent coating on a substrate comprising (I) coating said substrate with a radiation curable film forming composition comprising a mixture containing
    (a) a hydroxy-functional, cyclic polysiloxane resin having at least two hydroxyl groups per molecule;
    (b) a first compound of the formula

wherein R is —H or —CH3; and
    (c) a second compound of the formula

wherein R' is —H or —CH3, the molar ratio of said cyclic polysiloxane resin to said first compound being from about 2:1 to 1:10 and the molar ratio of said cyclic polysiloxane resin to said second compound being from about 3:1 to 1:5 and II) exposing the coated substrate to a source of ultraviolet light having a wave length of from about 250 to about 390 nm. to cure the composition.

2. A method of producing a hard adherent coating on a substrate as described in claim 1 in which the radiation curable film forming composition contains in addition up to 35% by weight of a monomer diluent.

3. A method of producin a hard adherent coating on a substrate as described in claim 1 in which the radiation curable film forming composition contains in addition up to 15% by weight of photosensitizer.

4. A method of producing a hard adherent coating on a substrate as described in claim 1 in which the radiation curable film forming composition contains in addition up to 1% by weight of an oxygen inhibitor.

5. A method of producing a hard adherent coating on a substrate as described in claim 1 in which said substrate is a steel razor blade.

6. A method of producing a hard adherent coating on a substrate as described in claim 1 in which the temperature during the curing process does not exceed 70° C.

7. A steel razor blade bearing a hard adherent coating produced by the radiation curing of a film forming composition comprising a mixture containing
 (a) a hydroxy-functional, cyclic polysiloxane resin having at least two hydroxyl groups per molecule;
 (b) a first compound of the formula

wherein R is —H or —$CH_3$; and
 (c) a second compound of the formula

wherein R' is —H or —$CH_3$, the molar ratio of said cyclic polysiloxane resin to said first compound being from about 2:1 to 1:10 and the molar ratio of said cyclic polysiloxane resin to said second compound being from about 3:1 to 1:5.

* * * * *